US006505083B1

(12) United States Patent
Pfeiffer et al.

(10) Patent No.: US 6,505,083 B1
(45) Date of Patent: Jan. 7, 2003

(54) APPARATUS FOR ASSEMBLING A DISC STORAGE SYSTEM INCLUDING A MODULAR INPUT/OUTPUT BOARD

(75) Inventors: Michael W. Pfeiffer, Richfield, MN (US); Eric D. Johnson, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/409,755

(22) Filed: Sep. 30, 1999

Related U.S. Application Data

(60) Provisional application No. 60/133,021, filed on May 7, 1999.

(51) Int. Cl.$^7$ ............................................. G05B 15/00
(52) U.S. Cl. ................................................ 700/1; 700/95
(58) Field of Search ................................ 710/1; 700/95

(56) References Cited

U.S. PATENT DOCUMENTS

| | | | |
|---|---|---|---|
| 3,471,822 A | 10/1969 | Van Baelen | 339/18 |
| 3,984,873 A | 10/1976 | Pejcha | 360/105 |
| 4,005,485 A | 1/1977 | Opocensky | 360/75 |
| 4,504,927 A | 3/1985 | Callan | 364/900 |
| 4,738,632 A * | 4/1988 | Schmidt et al. | 439/341 |
| 4,771,374 A * | 9/1988 | Ropelato | 700/1 |
| 4,790,762 A | 12/1988 | Harms et al. | 439/59 |
| 4,851,943 A | 7/1989 | Perry | 360/105 |
| 4,862,584 A | 9/1989 | Budy et al. | 29/704 |
| 4,916,600 A * | 4/1990 | Ropelato | 700/1 |
| 5,012,570 A | 5/1991 | Hoskins et al. | 29/467 |
| 5,150,512 A | 9/1992 | Hatchett et al. | 29/603 |
| 5,181,582 A | 1/1993 | Dambach et al. | 439/52 |
| 5,182,798 A * | 1/1993 | Francisco | 709/251 |
| 5,265,325 A | 11/1993 | Fortin | 29/742 |
| 5,465,467 A | 11/1995 | Krajec et al. | 29/759 |
| 5,471,733 A | 12/1995 | Bernett et al. | 29/603 |
| 5,692,289 A | 12/1997 | Amada et al. | 29/603.03 |
| 5,737,190 A | 4/1998 | Marshall et al. | 361/760 |
| 5,785,537 A | 7/1998 | Donahue et al. | 439/79 |
| 5,802,389 A * | 9/1998 | McNutt | 710/1 |
| 5,826,325 A | 10/1998 | Price et al. | 29/603.03 |
| 5,876,240 A | 3/1999 | Derstine et al. | 439/490 |
| 5,991,528 A * | 11/1999 | Taylor et al. | 703/6 |

* cited by examiner

Primary Examiner—Thomas Black
Assistant Examiner—Ronald D Hartman, Jr.
(74) Attorney, Agent, or Firm—Westman, Champlin & Kelly

(57) ABSTRACT

An apparatus for use in assembling a disc storage system includes a modular input/output board. The modular input/output board includes at least one modular input board configured to receive sensor inputs from an assembly system and at least one modular output board configured to drive actuators of the assembly system. A header board is configured to transfer input signals from the modular input board and to transfer controller outputs to the modular output board.

19 Claims, 3 Drawing Sheets

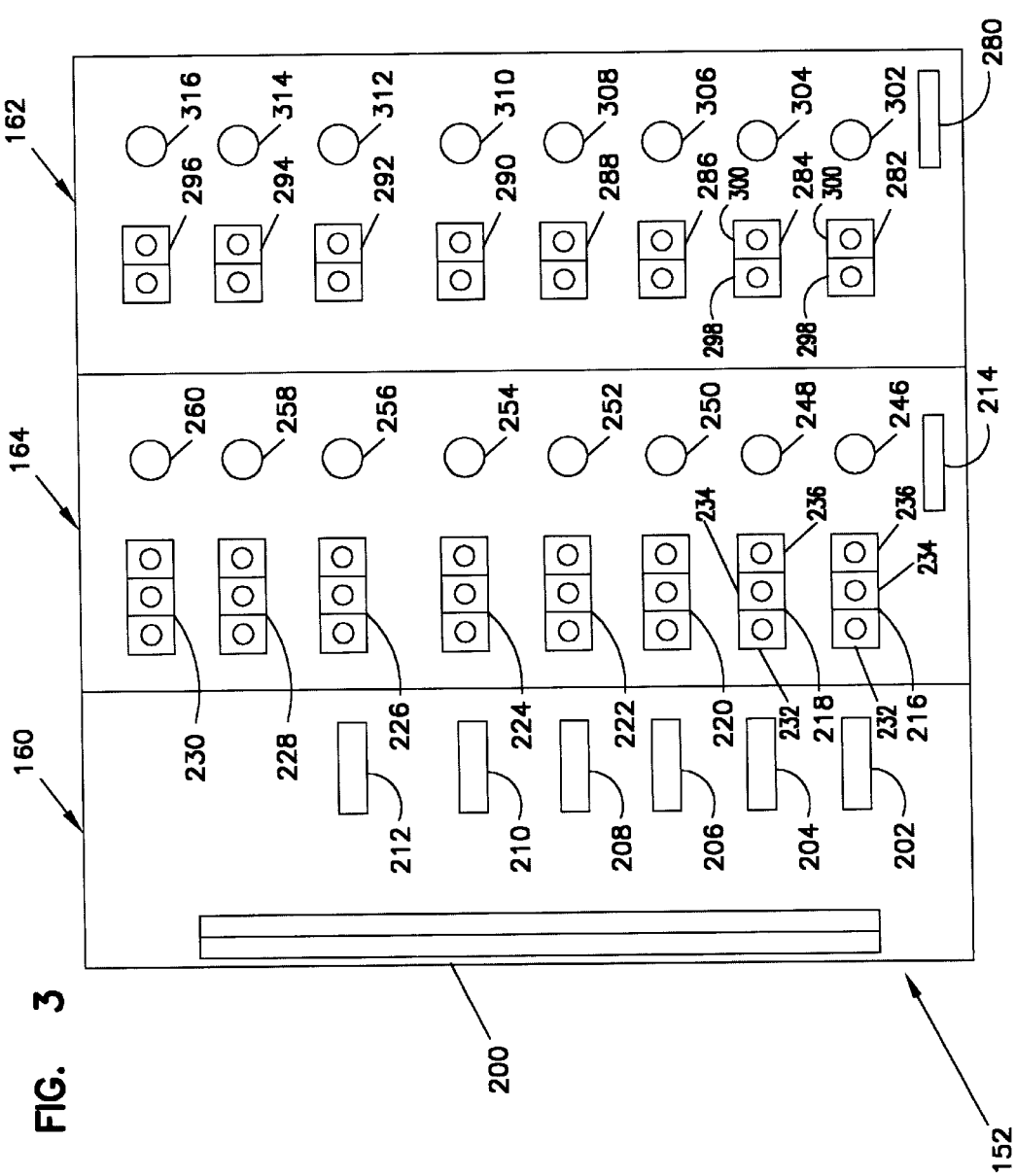

APPARATUS FOR ASSEMBLING A DISC STORAGE SYSTEM INCLUDING A MODULAR INPUT/OUTPUT BOARD

CROSS-REFERENCE TO CO-PENDING APPLICATION

This application claims priority benefits from U.S. provisional patent application Serial No. 60/133,021, filed May 7, 1999 and entitled "COMPACT MODULAR DIGITAL INPUT/OUTPUT BOARD."

FIELD OF THE INVENTION

The present invention relates generally to disc storage systems. More particularly, the present invention relates to an apparatus for use in assembling disc storage systems.

BACKGROUND OF THE INVENTION

Disc storage systems are used for storing information on one or more disc surfaces. The discs typically rotate at a relatively high speed while transducing heads which are carried on actuator armatures of an actuator assembly move across the disc surfaces. If multiple discs are used, they are typically carried on a single spindle.

As storage density has increased, the size of the transducing heads has been reduced while storage systems have simultaneously become more delicate and require improved alignment accuracy. A tool, known in the art as a "merge/demerge" tool, is used to assemble an actuator assembly with the disc surfaces. The merge/demerge tool can be used for both assembly and disassembly. During assembly, the tool brings the actuator assembly together with the disc surfaces and loads the transducing heads onto the disc surfaces without damage to the heads. This process is reversed for disassembly. Such merge/demerge tools are shown in, for example, U.S. Pat. No. 5,150,512 entitled "METHOD OF ASSEMBLING A DISK FILE" which issued Sep. 29, 1992 to IBM Corporation.

These merge tools are typically fairly large and relatively complex devices which must be customized for a particular model of disc drive. Their physical size make their transportation cumbersome. It is also typically fairly difficult to build these devices as they require a large number of sensors and actuator devices which must be individually wired and customized for each application.

The present invention provides a solution to this and other problems, and offers advantages over the prior art.

SUMMARY OF THE INVENTION

The present invention relates to merge and/or demerge tools which can be easily reconfigured and solve the above-mentioned problem.

In accordance with one embodiment of the invention, an apparatus for use in assembling a disc storage system includes an assembly controller configured to receive a plurality of sensor inputs and provide a plurality of controller outputs to thereby control a disc assembly system. A modular input/output board includes at least one modular input board configured to receive sensor inputs from the assembly system, at least one modular output board configured to send control outputs to the assembly system, and a header board configured to transfer input signals from the modular input board to the controller and to transfer controller outputs from the controller to the modular output board.

These and various other features as well as advantages which characterize the present invention will be apparent upon reading the following Detailed Description and review of the associated drawings.

BRIEF DESCRIPTION OF THE DRAWINGS

FIG. 3 is a more detailed top plan view showing a header board coupled to a modular input board and a modular output board.

DETAILED DESCRIPTION

Figure 1:
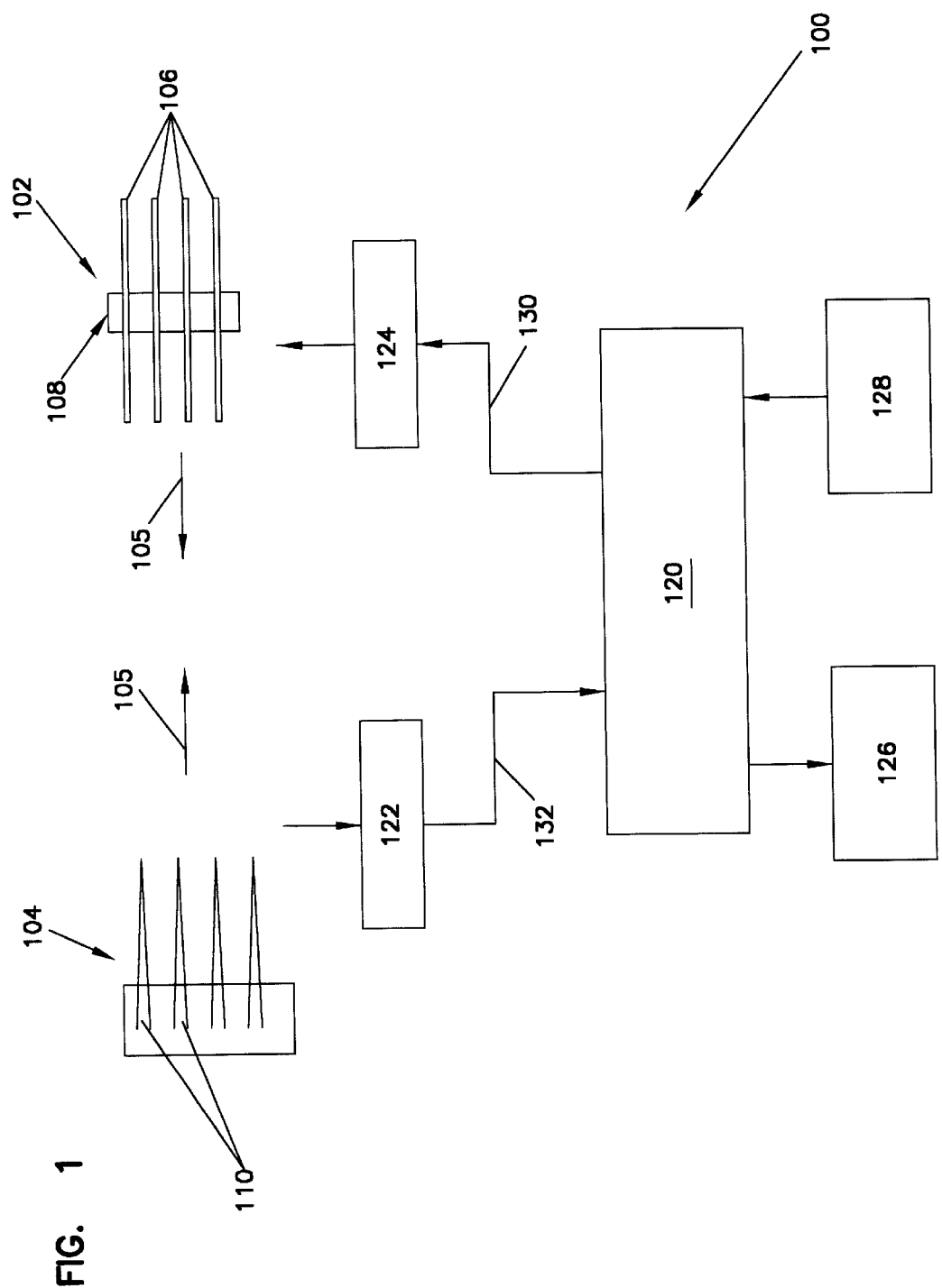
FIG. 1 is a simplified diagram illustrating a merge/demerge tool for assembling or disassembling disc drives.

Referring now to, FIG. 1 an apparatus 100 for use in assembling (or disassembling) a disc stack 102 with an actuator assembly 104 is shown in a simplified block diagram. Such an apparatus is known in the art as a merge/demerge tool. Disc stack or pack 102 includes a plurality of individual discs 106 carried on a spindle 108. Actuator assembly 104 includes a plurality of actuator arms 110 which carry transducing heads (not shown) on their distal ends. During assembly, the disc stack 102 and actuator assembly 104 are moved together as indicated by arrows 105 and the transducers are delicately positioned on the appropriate disc surfaces. In various embodiments of apparatus 100, the disc stack 102 itself can be assembled, the elements can be coupled or decoupled to/from motors such as spindle motors or voice coils for the actuator mechanism. The casing or other components can also be manipulated.

Apparatus 100 includes a control system 120 which couples to sensors 122 and actuators 124. Control system 120 also provides an output on output device 126 which may comprise, for example, a display and receive input through input device 128. Input device 128 can be, for example, a manual input for use by an operator or a network or computer input for receiving digital commands.

In operation, control system 120 causes the merge (or demerging) of disc stack 102 and actuator assembly 104 using actuators 124 which are controlled by actuator output 130. Actuators 124 can include a device which can be controlled by control system 120 including display devices. The position and movement of components of disc stack 102 and actuator assembly 104 are sensed using sensors 124 and provided to control system 120 using sensor input 132. This allows control system 120 to act as a controller based upon feedback from sensors 122 when controlling actuators 124. Sensors 122 and actuators 124 can be any type of sensors or actuation device known or developed in the art which is used in a merge/demerge tool.

Figure 2:
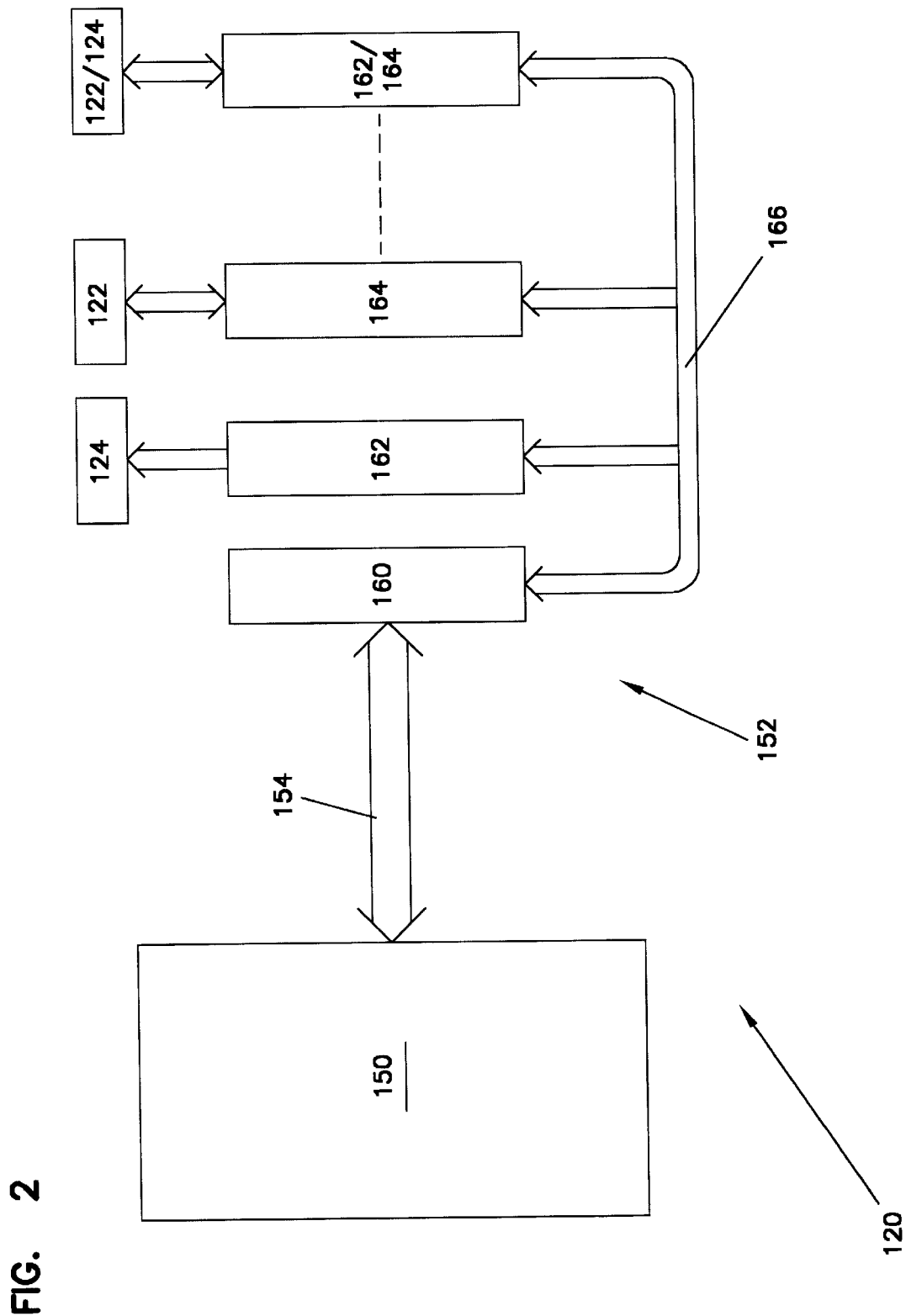
FIG. 2 is a simplified block diagram showing a controller of the tool shown in FIG. 1 coupled to modular input and output boards.

FIG. 2 is a simplified diagram of control system 120 showing controller 150 coupled to a modular input/output board 152 through a data bus 154 in accordance with one embodiment of the present invention. Controller 150 typically includes a microprocessor or other device for controlling operation of the actuators 124 in response to the sensors 122 illustrated in FIG. 1.

Modular input/output board 152 includes a header board 160 which couples to controller 150 through bus 154. Modular input/output board 152 also includes a modular output board 162 and a modular input board 164 which couple to header board 160 through bus 166. As illustrated in FIG. 2, modular output board 162 couples to actuators 124 and modular input board 164 couples to sensors 122. A plurality of output boards 162 and input boards 164 can couple to header board 160 through bus 166. In one preferred embodiment, a total of six input boards 164 or output boards 162 can couple to a single header board 160. Header board 160 couples data bus 166 with data bus 154 such that controller 150 can send commands to individual actuators and receive data from individual sensors. In one preferred embodiment, each output board 162 can provide a total of eight different outputs to eight different actuators and each input board 164 can receive a total of eight sensor inputs from eight sensors.

The modularity offered by the embodiment of input/output board 152 set forth in FIG. 2 offers both size reduction and design efficiency in comparison with prior art control systems used in merge/demerge tools. Using the embodiment set forth in FIG. 2, only the desired number of input boards 164 and output boards 162 need to be provided and coupled to the header board 160. This allows the control system 120 to be smaller than in comparable prior art designs and allows greater design flexibility for changing the configuration of the merge/demerge apparatus 100 to be modified to function with different types of disc drive systems.

FIG. 3 is a top plan view of header board 160, output board 162 and input board 164 shown assembled together. Header board 160 includes bus connection 200 which is configured to couple to bus 154 for communication with controller 150 shown in FIG. 2. Header board 160 also includes bus connections 202, 204, 206, 208, 210 and 212 which are used for coupling in input boards 164 or output boards 162. Header board 160 can, therefore, support a total of six input or output boards. Boards 160, 162 and 164 can be secured together using any appropriate technique, such as track which holds boards 160, 162 and 164.

Input board 164 includes bus connection 214 for coupling, for example, to bus connection 202 of header board 160 through bus 166 shown in FIG. 2. Input board 164 includes sensor input plugs 216, 218, 220, 222, 224, 226, 228 and 230 for coupling to a total of eight sensors 122 through sensor inputs 132 shown in FIG. 1. Each sensor plug 216–230 includes two sensor input connections 232 and 234 and a sensor power connection 236. Further, a light emitting diode (LED) or other display device 246, 248, 250, 252, 254, 256, 258 and 260 is associated with each sensor input 216–230, respectively. LEDs 246–260 are used for diagnostic purposes to indicate the receipt of data. Further, the power output 236 from each sensor input plug 216–230 can be used to power those types of sensors which require an external power source for their operation.

Output board 162 includes bus connection 280 for coupling to, for example, bus connection 204 of header board 160 through bus 166 shown in FIG. 2. Output board 160 includes a total of eight output plugs 282, 284, 286, 288, 290, 292, 294 and 296. Each output plug 282–296 includes output terminals 298 and 300 for coupling to actuators 124 shown in FIG. 1 through actuator outputs 130. Further, eight LED or other display devices 302, 304, 306, 308, 310, 312, 314 and 316 are associated with each respective output plug connection 282–296 and can be used for diagnostic purposes.

Although FIG. 3 only shows two modular boards, one input board 164 and one output board 162, additional modular boards can be configured to couple to header board 160. In the embodiment shown, a total of six modular boards can be coupled to bus connections 202–212 of header board 160. This configuration allows a total of 48 total input and/or output connections to be supported by a single header board 160.

The configuration provided with the present invention provides for a relatively small input/output board assembly with relatively inexpensive modular boards. Preferably, the output board 162 are capable of driving actuators requiring relatively large currents, for example 2 amps direct current (DC) or 1 amp alternating current (AC), using commonly available driver chips. In one embodiment, a solid state power relay available from International Rectifier, part number PVG 612 is used to drive the output. In one embodiment, each modular board has dimensions of 1.125"×4.25"×0.5" and typically requires less than half of the total size required in prior art designs. Each input and output uses a single removable connection with makes connection fast, simple and reliable. The header board 160 can be modified for use with different types of controllers 150. However, the modular boards 162 and 164 do not require reconfiguration for each type of controller. Instead, the header board 160 handles the interface between the controller 150 and the modular boards 162 and 164. This allows cost reduction because only a single input board 164 and output board 162 need be designed and can be reused for other configurations. Additionally, the header boards 160 can be designed to function with a bus 154 which is either serial or parallel. In one configuration, input board 164 is configured to receive either AC or DC inputs ranging between 0 volts and 60 volts. In one embodiment, opto-isolators are used to isolate the input signals from the other electronics. Such opto-isolators are available from NEC Corporation, part number P52505-1-NEC. Various sensors inputs through plugs 216–230 can receive either AC or DC sensor inputs.

Aspects of the present invention include input/output board 152 for use in an automated control system. The automated assembly system includes an assembly controller 150 configured to receive a plurality of sensor inputs and provide a plurality of controller outputs. The modular input/output board 152 includes at least one modular input board 164 configured to receive sensor inputs from the assembly system. Further, the modular input/output board 152 includes at least one modular output board 162 configured to drive components of the assembly system. The header board 160 of the modular input/output board 152 is configured to transfer input signals from the modular input board to the controller and to transfer controller outputs from the controller 150 to the modular output board 162.

The header board 160 includes a plurality of bus connections 202–212 configured to couple to the modular boards. The input and output boards include bus connections 214, 280 configured to couple to the header board 160 through a bus 166. The modular input board 164 includes at least one sensor plug 216–230 configured to couple to a sensor and receive sensor inputs. In one embodiment, a power output is configured for each of the sensor inputs to provide power to each of the sensors. LEDs 246–260 and 302–316 are configured to provide diagnostic information for the input and output boards. The output board 162 includes at least one output plug 282–296 configured to drive components of the assembly system. The inputs to the modular input board 164 can access both AC and DC signals ranging between 0 and about 60 volts. Further, inputs from either NPN or PNP transistor type sensors can be received. The output board is configured to provide outputs of up to 2 amps DC and 1 amp AC.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the modular input/output board while maintaining substantially the same functionality without departing from the scope and spirit of the present invention. In addition, although the preferred embodiment described herein is directed to a merge/demerge for a disc storage system, it will be appreciated by those skilled in the art that the teachings of the present invention can be applied to other machine control systems, like automated assembly systems, without departing from the scope and spirit of the present invention.

What is claimed is:

1. An apparatus for use in an automated assembly system, comprising:

an assembly controller configured to receive a plurality of sensor inputs and provide a plurality of controller outputs to thereby control the assembly system; and a modular input/output board including at least one modular input board configured to receive sensor inputs from the assembly system, at least one modular output board configured to drive components of the assembly system, and a header board configured to transfer input signals from the modular input board to the controller and to transfer controller outputs from the controller to the modular output board.

2. The apparatus of claim 1 wherein the header board includes a plurality of modular I/O bus connections configured to couple to modular boards.

3. The apparatus of claim 2 wherein the header board includes at least six modular I/O connections configured to couple to at least six modular boards.

4. The apparatus of claim 1 wherein each modular board includes a modular I/O bus connection configured to couple to the header board through a modular I/O bus.

5. The apparatus of claim 1 wherein the modular input board includes at least one sensor plug configured to couple to a sensor and receive sensor inputs.

6. The apparatus of claim 5 including at least eight input plugs for coupling to at least eight sensors.

7. The apparatus of claim 6 wherein the input plug is configured to accept both alternating current (AC) and direct current (DC) signals.

8. The apparatus of claim 6 wherein the input plug is configured to accept signals ranging between about 0 volts and about 60 volts.

9. The apparatus of claim 6 wherein the input plug is configured to accept signals from both NPN and PNP transistor type sensors.

10. The apparatus of claim 5 wherein the sensor plug includes a power output configured to provide power to a sensor.

11. The apparatus of claim 5 including a light emitting diode (LED) associated with the input plug configured to provide diagnostic information.

12. The apparatus of claim 1 wherein the modular output board includes at least one output plug configured to couple drive components of the assembly system.

13. The apparatus of claim 12 including at least eight output plugs.

14. The apparatus of claim 12 including at least one light emitting diode (LED) associated with the output plug configured to provide diagnostic information.

15. The apparatus of claim 12 wherein it is configured to provide an output of up to 2 amps direct current (DC) and 1 amp alternating current (AC).

16. The apparatus of claim 1 wherein the modular output board includes a modular I/O bus connection configured to couple to the header board through a modular I/O bus.

17. The apparatus of claim 1 wherein the modular input board includes a modular I/O bus connection configured to couple to the header board through a modular I/O bus.

18. The apparatus of claim 1 wherein the automated assembly system comprises a merge tool configured to assemble a disc storage system.

19. The apparatus of claim 1 wherein the automated assembly system comprises a demerge tool configured to disassemble a disc storage system.

* * * * *